(12) United States Patent
Escoffier et al.

(10) Patent No.: US 10,723,208 B2
(45) Date of Patent: Jul. 28, 2020

(54) TAILGATE FOR VEHICLE

(71) Applicant: Compagnie Plastic Omnium, Lyons (FR)

(72) Inventors: Arnaud Escoffier, Lyons (FR); Richard Bailey, Telford Shropshire (GB)

(73) Assignee: Compagnie Plastic Omnium (FR)

( * ) Notice: Subject to any disclaimer, the term of this patent is extended or adjusted under 35 U.S.C. 154(b) by 0 days.

(21) Appl. No.: 16/067,439

(22) PCT Filed: Dec. 28, 2016

(86) PCT No.: PCT/EP2016/082794
§ 371 (c)(1),
(2) Date: Jun. 29, 2018

(87) PCT Pub. No.: WO2017/114876
PCT Pub. Date: Jul. 6, 2017

(65) Prior Publication Data
US 2019/0023108 A1    Jan. 24, 2019

(30) Foreign Application Priority Data

Dec. 30, 2015 (EP) .................................. 15307173

(51) Int. Cl.
*B60J 5/10* (2006.01)
*B60Q 1/26* (2006.01)

(52) U.S. Cl.
CPC ............ *B60J 5/107* (2013.01); *B60Q 1/2619* (2013.01); *B60Q 1/2638* (2013.01)

(58) Field of Classification Search
CPC ....... B60Q 1/2619; B60Q 1/2638; B60J 5/107

USPC .......................................................... 296/56
See application file for complete search history.

(56) References Cited

U.S. PATENT DOCUMENTS

| 4,420,797 | A | | 12/1983 | Tohata | |
|---|---|---|---|---|---|
| 4,799,730 | A | * | 1/1989 | Harasaki | B60H 1/248 296/203.04 |
| 4,822,098 | A | * | 4/1989 | Vogt | B60J 5/101 296/146.5 |
| 6,203,094 | B1 | * | 3/2001 | Lee | B60J 1/1884 296/106 |
| 9,211,782 | B2 | * | 12/2015 | Rajon | B60J 5/107 |

(Continued)

FOREIGN PATENT DOCUMENTS

| EP | 0053783 A1 | 6/1982 |
|---|---|---|
| EP | 1803594 A1 | 7/2007 |
| FR | 2928894 A1 | 9/2009 |

*Primary Examiner* — Pinel E Romain
(74) *Attorney, Agent, or Firm* — St. Onge Steward Johnston & Reens, LLC

(57) ABSTRACT

A tailgate for a vehicle including an inner panel and an outer panel. The outer panel includes an appearance wall and an edge wall adjacent to the appearance wall and taking part in delimiting a housing for receiving an optical unit. The outer panel further includes a bridge wall, located on the inside face of the outer panel, forming a bridge between the edge wall and the appearance wall and serving as a part of a bonding interface between the outer panel and the inner panel. A process for molding the outer panel for the tailgate for a vehicle, wherein a movable slider is built and used in a mold to create a naturally non-demoldable hollow cavity delimited by the appearance wall, the edge wall and the bridge wall.

12 Claims, 3 Drawing Sheets

(56) References Cited

U.S. PATENT DOCUMENTS 9,506,619 B2 * 11/2016 Buisson .................. F21S 43/00
2007/0145768 A1 6/2007 Saitoh et al.
2012/0002434 A1 1/2012 Rajon et al.

* cited by examiner

TAILGATE FOR VEHICLE

FIELD OF THE INVENTION

The invention relates to the technical filed of tailgates for vehicle, particularly plastic tailgates, which often comprise optical units.

BACKGROUND OF THE INVENTION

A tailgate for vehicle usually comprises an inner panel as a structural part and an outer panel as an appearance skin. Sometimes it further comprises optical units, also named rear lights, disposed on right and left ends of the tailgate.

The appearance of tailgates varies a lot, depending on different externally-visible style shapes of the whole vehicle, so does the appearance of rear lights which are integrated thereon. Therefore, on a tailgate for vehicle in question are provided housings to receive optical units and their shapes should be adapted at least both as an integration and fixation interface of the optical units and also be consistent to realize the external style shapes of the tailgate.

SUMMARY OF THE INVENTION

In addition to the need for aesthetic appearance, there is a strong need for the internal waterproofness (or tightness) of the tailgate for vehicle whose internal volume includes electrical devices. To this end, it is known to ensure waterproofness of the tailgate by means of a continuous seal path 4 between an inner panel 1 and an outer panel 2 which form the tailgate and delimit at least one optical housing 14 together, as shown in FIG. 1. This seal path, which is often made of glue, is generally applied on the inside face of the outer panel and also used for bonding the outer panel with the inner panel together. Due to constraints of mass production of vehicles, the glue forming the seal path is usually deposited by a robot 3. As shown in FIG. 1 a, for the purpose of having a correct seal path, the robot 3 has to apply glue on the outer panel 2 with an angle normal to the inside face (thus normal to the seal path itself) so as to move along the inside face of the outer panel with a number of parallel travels to apply glue bead as required. Then the inner and outer panels, with the seal path made of glue on the inside face of the outer panel, are bonded together by being pressed against each other in a main bonding direction of the tailgate so as to avoid to spread the glue. This main bonding direction is normal to the global form of the tailgate for vehicle. Although FIG. 1 illustrates the main bonding direction as the dotted line 5, it should be understood that the direction indicated by the dotted line 5 is illustrative, given only as an example and not limitative at all, because FIG. 1 is a partial view of an exemplary tailgate for vehicle and only schematically illustrates one exemplary optical housing located at one side of the tailgate.

However, due to the main bonding direction and due to the shape of the optical housing area which includes right or sharp or acute angles, it could be almost impossible for a single-axis robot to apply glue, particularly in corners located on the inside face of the outer panel just around the optic units. Alternatively, using a robot with a smaller applicator or with multi-axis could be helpful in some cases but not in all cases nor allows to apply glue normally to the seal path.

Moreover, the respective housing's upper walls formed by the outer and inner panels are often oriented in such a way (almost parallel, or even worse in an undercut position, with respect to the main bonding direction) that:

at first does not allow an easy fitting while bringing one panel to the other to their final assembled position along the main bonding direction;

then makes it difficult or impossible to apply a proper pressure (by "proper pressure", it is meant a pressure which is almost constant over the whole seal path whatever the 3D shape of the taillight area) for assembling the two panels on the glue bead applied on a portion of the inside face on the outer panel, because the pressure is applied mainly in a direction perpendicular to the rest of the contour/perimeter of the whole tailgate which is more or less planer than this local portion.

Insufficient or even no pressure applied on the glue bead between the two panels could lead to a discontinuous sealing and water leakage inside the tailgate.

The invention seeks thus to provide a tailgate for vehicle wherein the bonding sealing of the panels forming the tailgate is facilitated and efficient, particularly around the optical unit housing.

One subject of the invention lies in providing a tailgate for vehicle, comprising:

an inner panel, an outer panel including an appearance wall and an edge wall adjacent to the appearance wall and taking part in delimiting a housing for receiving an optical unit, wherein the outer panel further includes a bridge wall, located on the inside face of the outer panel, forming a bridge between the edge wall and the appearance wall and serving as a part of a bonding interface between the outer panel and the inner panel.

Thanks to said bridge which provides an additional surface for covering such an inaccessible hollow cavity, the inside face of the outer panel to be bonded to the inner panel is easily accessible by a robot and its applicator: for bonding the outer panel with the inner panel, it is no longer necessary to apply glue on walls of a deep corner with right or sharp or acute angle therebetween. Furthermore, the proper pressing (see above) of the outer and inner panels against each other in the main bonding direction is easier and more reliable. In other words, it can be avoided to suffer a bonding surface, around the optical housing, which is formed by corners of shapes with an angle less than or about 90°, in other words an acute angle or an almost right angle.

Therefore, it is advantageous that the bonding interface between the inner and outer panels can be flatter and smoother, that is to say, with gentler slopes, and that deep enough optical housings can be still formed on the outer panel. This significantly improves the assembly process of the two panels by facilitating the access of a robot used for bonding for example by gluing and the proper pressing of the two panels against each other in the main bonding direction, and in the meantime allows a very varied style of the tailgate for vehicle. With this adaptation, the surfaces to be bonded of the inner and outer panels will be in a better contact with each other all along the main bonding direction. Furthermore, it is guaranteed that a seal path will be continuous with sufficient glue and lead to a proper waterproofness of the tailgate for vehicle, especially in the taillight area.

The tailgate may also preferably include at least one of the following features, separately or in combination.

The bridge wall located on the inside face of the outer panel preferably forms an obtuse angle with the bottom wall of the housing for receiving the optical unit.

The inner panel to be bonded to the outer panel preferably presents an obtuse angle almost equal to the obtuse angle formed by the bridge wall of the outer panel and the bottom wall of the housing receiving the optical unit. It is noted that the obtuse angle of the outer panel is decided by the position of the bridge wall and can be up to nearly 180°, as well as the obtuse angle of the inner panel. The closer the obtuse angle is to 180°, the flatter the bonding interface between the outer panel and the inner panel at this local taillight area is. Thus, it is easier to properly press and assembly the outer and inner panels and the bonding therebetween is more reliable.

The housing for receiving the optical unit is preferably located inside the perimeter of a continuous seal path which is formed on the inside face of the outer panel: this insures that the electrical wiring and components of the optical unit are inside the dry volume between the two panels. In other words, the continuous seal path of the tailgate defines a watertight zone which includes, and thus protects, the housing for receiving the optical unit.

The appearance wall, the edge wall and the bridge wall preferably delimit a hollow cavity. Thus, the outer panel of the tailgate is quite innovative in that it forms by itself a hollow cavity. The shape of the hollow cavity can be varied as a function of the shape of the housing receiving the optical unit and the visible appearance of the vehicle as required.

The hollow cavity of the outer panel preferably defines a volume with an approximately triangular transversal (or lateral) section, along the XZ plane of the vehicle, and thus enhances the mechanical resistance of the hollow cavity. However, many other shapes are possible, depending of the design of the tailgate.

The hollow cavity is preferably closed on one end by an end wall which is preferably disposed on the most lateral side of the tailgate. Thus, entry of water between the inner and the outer panels is avoided and furthermore there is no non-aesthetic part visible from outside of the tailgate.

The assembly of the inner panel with the outer panel is preferably realized by gluing and pressing, wherein the gluing is preferably waterproof gluing by means of a robot. Advantageously, since the bonding interface between the inner panel and the outer panel can be flatter and smoother, a robot used to apply glue can enter and move along the whole inside face on the outer panel more easily and smoothly. This gives more freedom for the choice of the robot because it is no longer necessary to use a robot with smaller applicator or multi-axis. As a result, the glue can be advantageously deposited to be continuous and sufficient. Furthermore, it is easier for the outer panel and the inner panel to approach each other and to be fitted together. Then it allows to properly press the two panels against each other in the main bonding direction, in other words, it is capable of applying a pressure to the glue bead on the inside face of the outer panel in the main bonding direction which is almost constant over the whole seal path regardless of the complexity of the 3D shape the taillight area, so as to bond the two panels firmly with sufficient glue distributed therebetween as required. The waterproofness of the tailgate is thus guaranteed.

The bridge wall preferably forms a bridge between the edge wall and the inside surface of a styling line made on the appearance wall. In other words, the bridge wall is connected to the appearance wall in the area of a styling line. A styling line of the tailgate has usually to be understood as a line forming an angle or a visual rupture on the outside surface of the tailgate, for example due to a folding of the surface. By connecting the bridge wall to the appearance wall in the area of a styling line, some defects of the surface of the tailgate for vehicle due to the joining between the bridge wall and the appearance wall, for example shrink marks, are not visible from outside, as they are shaded or masked by the styling line. Thus it is advantageous to make the bridge wall join to the appearance wall behind a styling line thereon where the appearance wall has a change in angle (usually by folding), so that at lease some of the defects can be less easily seen from the outside of the vehicle.

Another subject of the invention lies in providing a process for molding an outer panel for a tailgate for vehicle according to any embodiment as mentioned above, wherein a movable slider is built and used in a mold to create a hollow cavity delimited by the appearance wall, the edge wall and the bridge wall. Such a hollow cavity, which is no longer naturally demoldable as being covered by the bridge wall, is thus easier to be molded. This movable slider is a retractable core for the case of injection molding.

It is understood that the tailgate for vehicle as obtained allows more design freedom and manufacturing feasibility to achieve a watertight condition in the assembling process of the outer and inner panels.

BRIEF DESCRIPTION OF THE DRAWINGS

The accompanying drawings are used to schematically illustrate presently preferred but non-limiting exemplary embodiments of the present invention. The above and other advantages and features of the invention will become more apparent and the invention will be better understood by reading the following detailed description with reference to the accompanying drawings. It should be understood that all the directions, shapes, angles, dimensions including lengths and thicknesses, distances and so on shown in these drawings are given only for the purpose of illustrating and the invention is not limited to them. In the accompanying drawings.

DETAILED DESCRIPTION OF THE INVENTION

Preferred embodiments of a tailgate for vehicle as described above are now described with reference to the accompanying drawings, in which same references are used for similar elements having similar functions.

Figure 1:
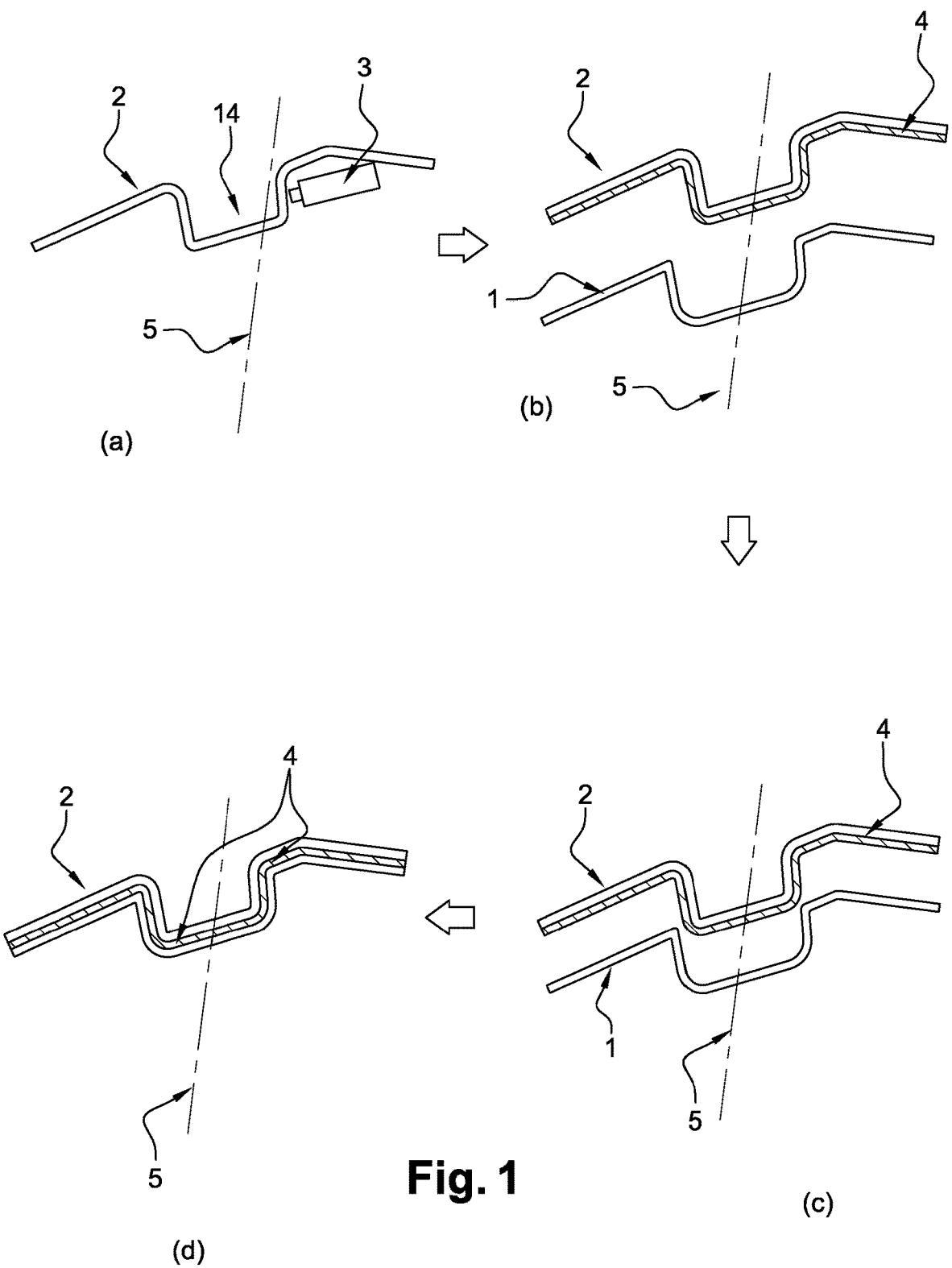
FIG. 1 schematically illustrates the principal steps for assembling an inner panel with an outer panel for forming a tailgate for vehicle according to the prior art.
Figure 2:
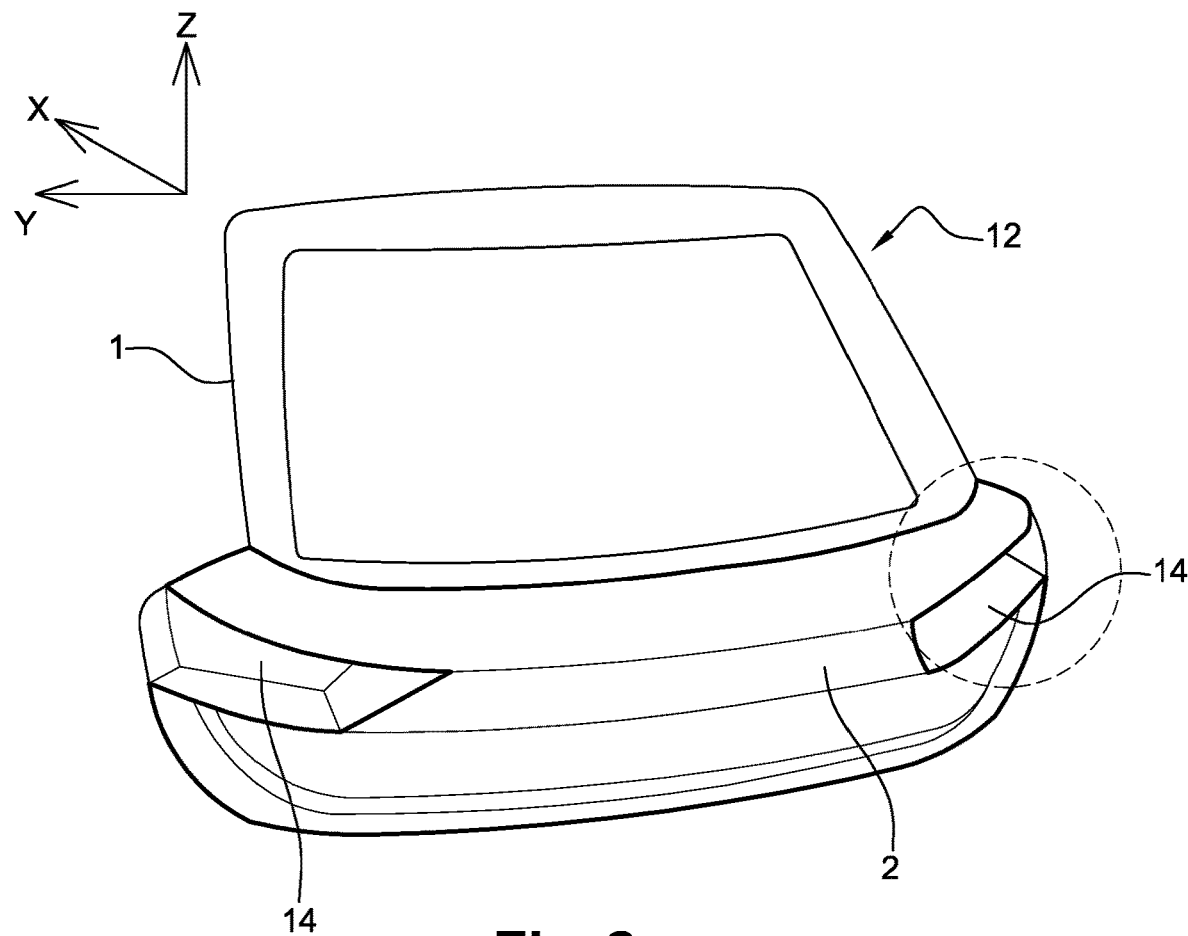
FIG. 2 is an outside view of a tailgate for vehicle according to an embodiment of the invention, viewed from the rear of a vehicle, wherein the XYZ directions of the vehicle are schematically illustrated.

FIG. 2 schematically illustrates an embodiment of a tailgate 12 for vehicle according to an embodiment. This tailgate for vehicle is designed to have optical housings 14 for receiving taillights (or rear lights), which are for example arranged symmetrically at both lateral sides of the tailgate in this embodiment. As a result of very varied styles between vehicles, the optical housings 14 located on the tailgate can be very varied in shapes, for example is deep with steep walls which forms acute or almost right angles with the bottom of the housing or with the outside surface of the tailgate (which is visible from outside of the vehicle).

The tailgate 12 comprises an inner panel 1 and an outer panel 2. The inner panel 1 is partially shown in FIG. 2. The outer panel 2 is schematically shown in FIG. 2. Preferably, the inner panel 1 is a structural part of the vehicle while the outer panel 2 is an appearance part. For example, the inner panel 1 is a frame of the tailgate made of thermoplastic (such as PP) or of thermoset plastic (preferably SMC, that is, Sheet Molding Compound) and the outer panel 2 is the outside skin of the tailgate made of thermoplastic material, such as PP. The inner panel and outer panel normally have complex three-dimensional shapes, which are surely not limited to what schematically shown in the figures.

Figure 3:
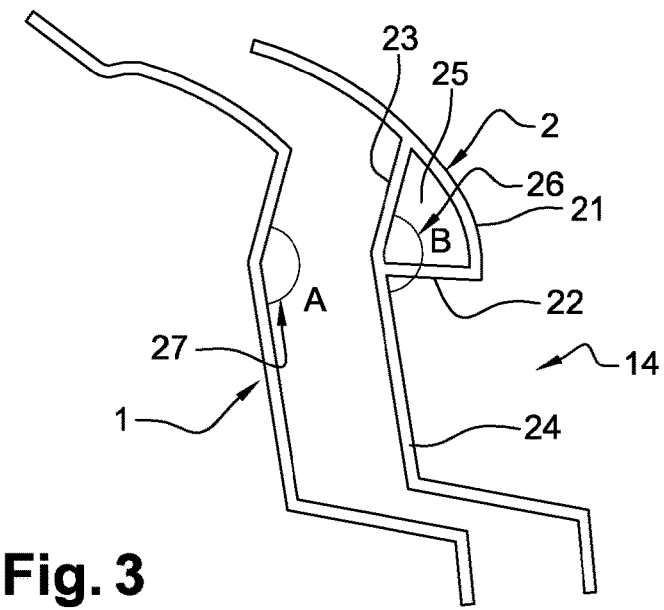
FIG. 3 is a schematic lateral exploded section (along the XZ plane) of the taillight area circled in FIG. 2.
Figure 4:
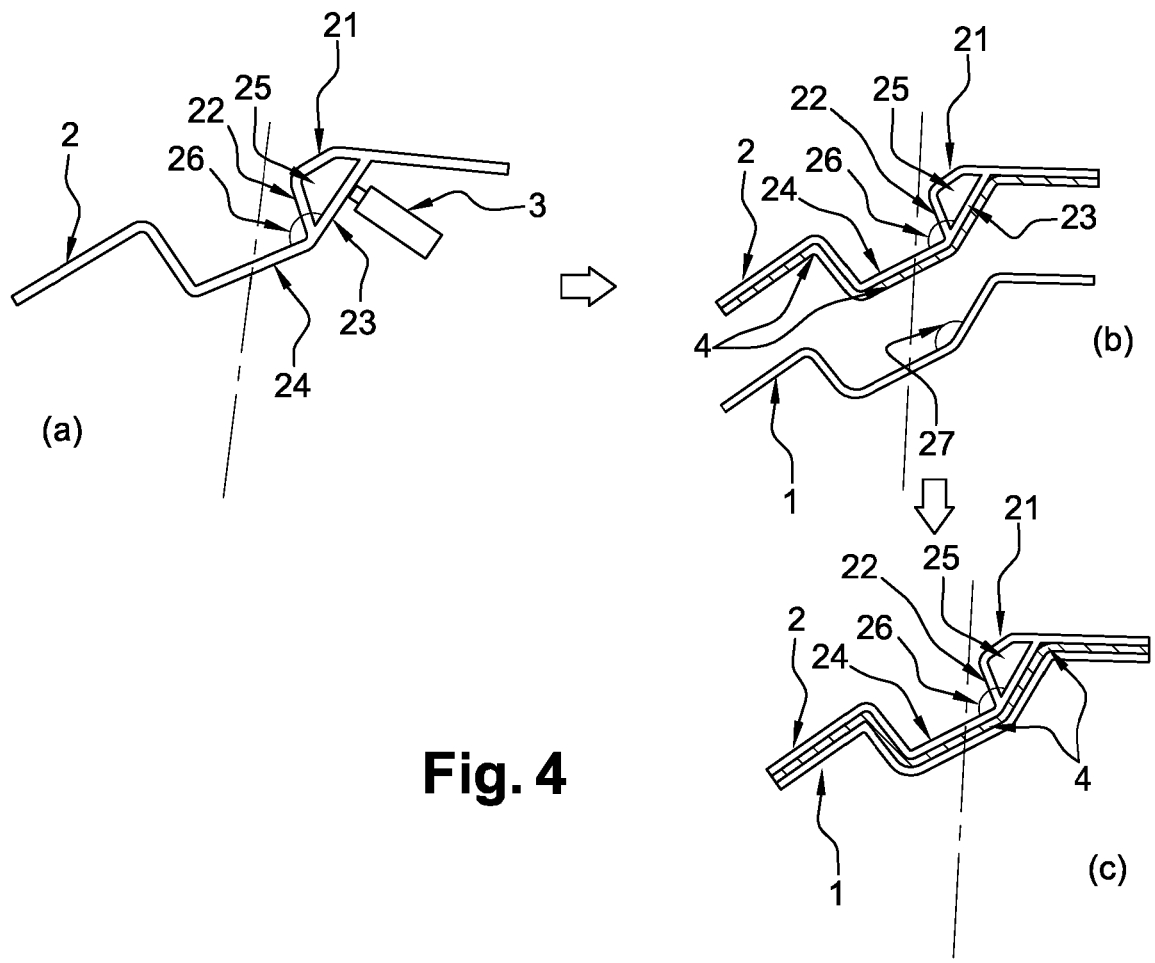
FIG. 4 schematically illustrates the principal steps for assembling the inner panel with the outer panel for forming the tailgate of FIG. 2.

Now reference is made to FIGS. 3 and 4. The outer panel 2 comprises, among others, an appearance wall 21 and an edge wall 22, as shown in FIG. 3. The edge wall 22 is adjacent to the appearance wall 21 and takes part in delimiting the housing 14 for receiving the optical unit. The outer panel 2 can further comprise a bottom wall 24, which forms the bottom of the housing 14, that is to say, the bottom wall 24 also takes part in delimiting the housing 14. The other walls of the housing which are not visible in the view of FIG. 3 are not described here for sake of succinctness. In this embodiment, the edge wall 22 is quite normal to the appearance wall 21, and the bottom wall 24 is quite normal to the edge wall 22. We can say that here the edge wall 22 forms a nearly right angle with the bottom wall 24 which is normally slightly bigger than 90° so as to facilitate the demolding of the panel and the installation in place of the optical unit, and forms a right or sharp or acute angle with the appearance wall 21.

The outer panel 2 further comprises, on its inside face, a bridge wall 23, designed as a bridge between the upper edge wall 22 and the appearance wall 21 for covering the volume therebetween. The bridge wall 23 also serves as a part of a bonding surface B to be bonded to a surface A of the inner panel 1, wherein the bonding of the surfaces A and B is preferably realized by means of gluing. The gluing is advantageously used for sealing the volume between the two panels to keep it dry, so as to protect the electrical wiring and components located between the two panels, inside the tailgate from being affected with damp. Usually, the glue is applied by a robot 3 (as shown in FIG. 4*a*), often on the inside face of the outer panel 2, so as to obtain a seal path 4 formed by glue bead (as shown in FIG. 4*b*) which is continuous and waterproof. The seal path preferably forms a closed loop on its own.

As it can be seen from FIGS. 3 and 4, the bridge wall 23 forms an obtuse angle 26 with the bottom wall 24, instead of the nearly right angle between the edge wall 22 and the bottom wall 24. Moreover, the surface A of the inner panel 1, which is to be bonded to the bonding surface B of the outer panel 2, forms an obtuse angle 27 preferably almost equal to the obtuse angle 26 formed by the bridge wall 23 and the bottom wall 24 of the outer panel 2. Here, it should be understood that the obtuse angles 26 and 27 are viewed from the outside of the tailgate and toward the inside thereof. It is also noted that the obtuse angle 26 of the outer panel 2 is defined by the position of the bridge wall 23 and can be up to nearly 180°, as well as the obtuse angle 27 of the inner panel 1, in other words, the bonding surface B of the outer panel 2 and the surface A of the inner panel 1 to be bonded to the bonding surface B of the outer panel 2 is flatter at this taillight area by means of the bridge wall 23. It should be understood that a small fabrication tolerance may be present to cause that the two obtuse angles 26, 27 are not precisely equal to each other.

Advantageously, the appearance wall 21, the edge wall 22 and the bridge wall 23 delimit a hollow cavity 25. It should be understood that the form of the lateral section of the hollow cavity 25 along the XZ plane of the vehicle is not limited to the example shown in FIGS. 3 and 4, but is varied as a function of the shape of the housing and the style of the tailgate. Also, as can be seen from FIG. 5, the hollow cavity 25 is closed on at least one end by an end wall 28 which is preferably located on the lateral side of the tailgate, so that entry of water between the inner and the outer panels is avoided. Thus the end wall 28 is visible from outside of the vehicle.

It is also noted that among the walls 21, 22, 23 and 24 of the outer panel 2, the appearance wall 21 is the only wall visible from outside of the vehicle when the optical unit, like a taillight, is well installed in place in the housing 14.

According to an embodiment, the bridge wall 23 forms a bridge between the edge wall 22 and a styling line on the appearance wall 21, the styling line corresponding usually to a folding of the appearance wall 21, creating a line forming an angle or a visual rupture on the outside surface of the tailgate. Particularly, the joining of the bridge wall 23 to the appearance wall 21 possibly creates defects on the surface of the tailgate 12 for vehicle, such as shrink marks and so on. Thus it is advantageous to make the bridge wall 23 join to the appearance wall 21 behind a styling line, so that at least certain of the defects are less easily visible from the outside of the vehicle as being shaded by the outstanding styling line.

Figure 5:
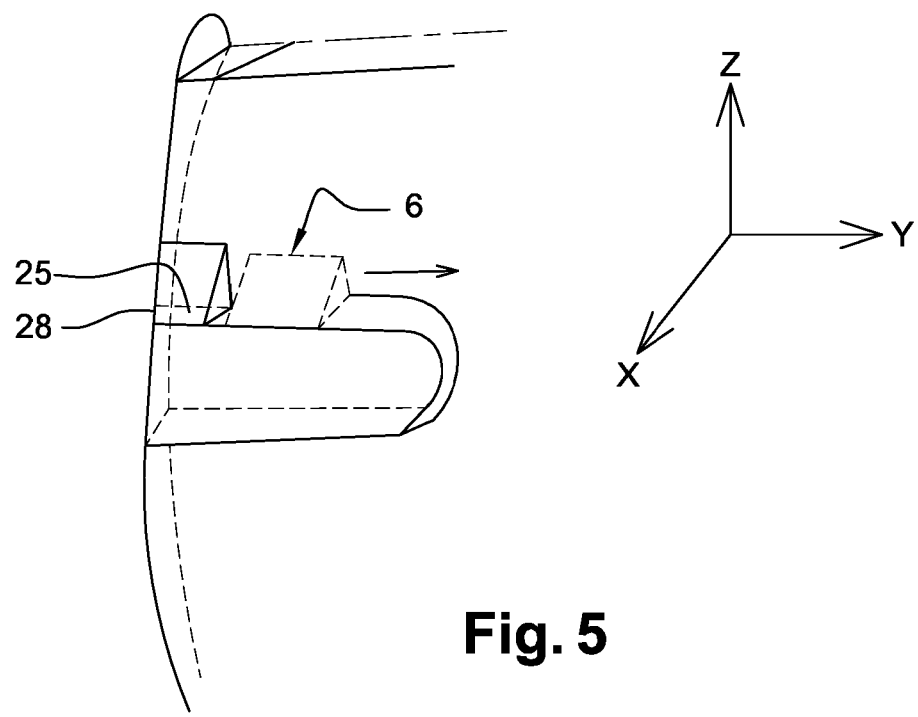
FIG. 5 is a schematic perspective view, from the inside face of the inner panel, showing the withdrawing of a movable slider when molding the outer panel of the tailgate of FIG. 2.

A process for manufacturing the tailgate 12 for vehicle is now described, with reference to FIGS. 4 and 5.

FIG. 4 schematically illustrates in sequence the main steps of assembling the outer and inner panels 1 and 2 for manufacturing the tailgate for vehicle as mentioned above (in the figure the dotted line indicates the main bonding direction of the two panels as mentioned above):

applying material for bonding such as glue on the bonding surface B (the inside face) of the outer panel 2 by means of the gluing robot 3, wherein it can be seen that the robot 3 can access to and move along the bonding surface B quite easily and smoothly because the bonding surface B presents fewer steep slope(s) (FIG. 4*a*);

moving the robot 3 all along the bonding surface B of the outer panel 2 in a number of travels, until a continuous seal path 4 for bonding is properly formed (FIG. 4*b*);

then pressing the outer panel 2 and the inner panel 1 with sufficient pressure mainly in the tailgate bonding direction i.e. the main bonding direction as mentioned above, so as to assemble the two panels together with a good tightness therebetween (FIG. 4*c*).

As can be seen from FIG. 5, a process for manufacturing the tailgate for vehicle according to an embodiment of the invention consists of molding the outer panel 2 by means of a movable slider 6, which is built and used in the mold to create the hollow cavity 25 delimited by the appearance wall 21, the edge wall 22 and the bridge wall 23 of the outer panel 2. It is noted that without the bridge wall 23, the volume between the edge wall 22 and the appearance wall 21 is naturally demoldable. Such volume becomes naturally non-demoldable after being covered by the bridge wall 23 and thus the movable slider is needed. For the injection molding, the movable slider is a retractable core. The slider can be easily removed through another non-closed end which is opposite to the end closed by the end wall 28 according to an embodiment.

So far, the invention has been described by means of a limited number of embodiments. However, it should be understood that without prejudice to the underlying principles of the invention, the details and the embodiments may vary, even appreciably, with respect to what has been described by way of example only, without departing from the scope of the invention as defined by the annexed claims.

The invention claimed is:

1. A tailgate for a vehicle, comprising:
an inner panel,
an outer panel including an appearance wall and an edge wall adjacent to the appearance wall and taking part in delimiting a housing for receiving an optical unit,
wherein the outer panel further includes a bridge wall, located on an inside face of the outer panel and forming a bridge between the edge wall and the appearance wall and serving as a part of a bonding interface between the outer panel and the inner panel.

2. The tailgate for a vehicle according to claim 1, wherein the bridge wall of the outer panel forms an obtuse angle with a bottom wall of the housing for receiving the optical unit, the obtuse angle of the outer panel is viewed from the outside of the vehicle.

3. The tailgate for a vehicle according to claim 2, wherein a surface of the inner panel which is bonded to a bonding surface of the outer panel forms an obtuse angle which is almost equal to the obtuse angle formed by the bridge wall of the outer panel and the bottom wall of the housing for receiving the optical unit, the obtuse angle of the inner panel is viewed from the outside of the vehicle.

4. The tailgate for a vehicle according to claim 1 further comprising, the housing for receiving the optical unit is located inside the perimeter of a continuous seal path, which is formed on the bonding surface of the outer panel by the bonding.

5. The tailgate for a vehicle according to claim 1, wherein the appearance wall, the edge wall and the bridge wall delimit a hollow cavity.

6. The tailgate for a vehicle according to claim 5, wherein the hollow cavity is closed on one end by an end wall.

7. The tailgate for a vehicle according to claim 1, wherein the bonding of the inner panel and the outer panel is realized by gluing and pressing.

8. The tailgate for a vehicle according to claim 7, wherein the gluing is waterproof gluing by means of a robot.

9. The tailgate for a vehicle according to claim 1, wherein the bridge wall forms a bridge between the edge wall and an inside surface of a styling line made on the appearance wall.

10. A process for molding an outer panel for a tailgate comprising:
providing a mold for molding an inner panel and an outer panel including an appearance wall and an edge wall adjacent to the appearance wall and taking part in delimiting a housing for receiving an optical unit, wherein the outer panel further includes a bridge wall, located on an inside face of the outer panel and forming a bridge between the edge wall and the appearance wall and serving as a part of a bonding interface between the outer panel and the inner panel;
wherein a movable slider is built and used in the mold to create a naturally non-demoldable hollow cavity delimited by the appearance wall, the edge wall and the bridge wall.

11. The process according to claim 10, wherein the movable slider is a retractable core for injection-molding.

12. The tailgate for a vehicle according to claim 5, wherein the hollow cavity is closed on one end by an end wall which is disposed on a most lateral side of the tailgate for the vehicle.

* * * * *

UNITED STATES PATENT AND TRADEMARK OFFICE
CERTIFICATE OF CORRECTION

PATENT NO. : 10,723,208 B2  
APPLICATION NO. : 16/067439  
DATED : July 28, 2020  
INVENTOR(S) : Arnaud Escoffier et al.

Page 1 of 1

It is certified that error appears in the above-identified patent and that said Letters Patent is hereby corrected as shown below:

On the Title Page

Item (71), Line 1:  
"Compagnie Plastic Omnium, Lyons"  
Should be changed to:  
-- Compagnie Plastic Omnium, Lyon --

Item (72), Line 1:  
"Arnaud Escoffier, Lyons"  
Should be changed to:  
-- Arnaud Escoffier, Lyon --

Signed and Sealed this  
Eighth Day of September, 2020

Andrei Iancu  
*Director of the United States Patent and Trademark Office*